US012765461B2

(12) United States Patent
Brockmann

(10) Patent No.: US 12,765,461 B2
(45) Date of Patent: Oct. 20, 2026

(54) FORAGE HARVESTERS

(71) Applicant: AGCO International GmbH, Neuhausen (CH)

(72) Inventor: Andreas Brockmann, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 333 days.

(21) Appl. No.: 18/421,174

(22) Filed: Jan. 24, 2024

(65) Prior Publication Data

US 2024/0276917 A1 Aug. 22, 2024

(30) Foreign Application Priority Data

Feb. 21, 2023 (GB) ..................................... 2302457

(51) Int. Cl.
*A01D 43/08* (2006.01)
*A01D 69/03* (2006.01)
*A01D 69/08* (2006.01)
*A01D 69/10* (2006.01)

(52) U.S. Cl.
CPC ........... *A01D 43/085* (2013.01); *A01D 69/03* (2013.01); *A01D 69/08* (2013.01); *A01D 69/10* (2013.01)

(58) Field of Classification Search
CPC .... A01D 43/085; A01D 43/086; A01D 69/03; A01D 69/08; A01D 69/10; A01D 75/20; A01F 29/26
See application file for complete search history.

(56) References Cited

U.S. PATENT DOCUMENTS

| | | | | |
|---|---|---|---|---|
| 4,073,377 A * | 2/1978 | Stoessel | A01F 29/10 241/222 |
| 8,869,522 B2 * | 10/2014 | Bohrer | A01D 41/1274 56/10.2 J |
| 10,492,363 B2 * | 12/2019 | Matousek | A01D 41/1217 |
| 2003/0172638 A1 * | 9/2003 | Ameye | F16H 61/4104 56/16.4 R |
| 2013/0247527 A1 | 9/2013 | Brockmann | |

OTHER PUBLICATIONS

UK Intellectual Property Office, Search Report for GB Application No. GB2302457.3, dated 21, AGO 2023, 3 pages.

* cited by examiner

*Primary Examiner* — Brad Harcourt

(57) ABSTRACT

A drive system for a forage harvester is disclosed. In a forage harvester having a prime mover (10), a chopper drum (4) driven from the prime mover (10) via a drive train, and feed rolls (34,36), the drive system comprises a clutch (24) operable between an engaged condition connecting the chopper drum (4) to the prime mover (10) and a disengaged position in which the chopper drum (4) is disconnected from the prime mover, a first hydraulic variable displacement pump (16) connected with the chopper drum (4) which pumps fluid around a first hydraulic circuit connected to a first motor (46), a second hydraulic variable displacement pump (14) which pumps fluid around a second hydraulic circuit to a feed roll motor (38) connected with the feed rolls (34,36) of the forage harvester. The drive system further comprises a single charge pump (30) hydraulically connected to both the first hydraulic variable displacement pump (16) and the second hydraulic variable displacement pump (14).

10 Claims, 3 Drawing Sheets

FORAGE HARVESTERS

CROSS-REFERENCE TO RELATED APPLICATIONS

Not applicable.

FIELD

The present invention relates to an improved forage harvester, and, in particular, to a drive system for components of the forage harvester.

BACKGROUND

In the absence of a suitable braking system, the large inertia and speed of rotation of a chopper drum within a forage harvester means it can often take 50 seconds or more for the chopper drum to cease rotation. This creates an undesirable danger and risk of injury to an operator of the forage harvester.

A number of solutions to this problem have been proposed.

In WO 2011/128286 (AGCO International GmbH) a system is disclosed in which the chopper drum is driven from a prime mover of the forage harvester via a drive train, said braking system comprising a clutch operable between an engaged condition connecting the chopper drum to the prime mover and a disengaged position in which the chopper drum is disconnected from the prime mover. The hydraulic circuit includes a first pump connected with the chopper drum which pumps fluid around the hydraulic circuit, and a second pump connected with feed rolls of the forage harvester which feed crop to the chopper drum as well as a pilot-operated diverter valve/chopper drum brake valve. Both the first pump and the second pump require individual charge pumps to charge the first and second pumps. This adds complexity and cost to the hydraulic circuit.

Advantages of the present invention will be apparent from the description below.

BRIEF SUMMARY

According to a first aspect of the present invention, in a drive system for a forage harvester, the forage harvester comprises a prime mover, a chopper drum driven from the prime mover via a drive train, and feed rolls, the drive system comprises a clutch operable between an engaged condition connecting the chopper drum to the prime mover and a disengaged position in which the chopper drum is disconnected from the prime mover, a first hydraulic variable displacement pump connected with the chopper drum which pumps fluid around a first hydraulic circuit connected to a first motor, a second hydraulic variable displacement pump which pumps fluid around a second hydraulic circuit to a feed roll motor connected with the feed rolls of the forage harvester, characterised in that the drive system further comprises a single charge pump hydraulically connected to both the first hydraulic variable displacement pump and the second hydraulic variable displacement pump.

Preferably, when the clutch is operated to adopt the disengaged position and isolate the chopper drum from the prime mover, the drive system is operated to brake the chopper drum by operating a pilot-operated blocking valve in the first hydraulic circuit to disconnect fluid flow between the first pump and the first motor and divert flow through a high pressure relief valve located internally of the first hydraulic variable displacement pump.

More preferably, the drive system further comprises an electronic controller operable to control operation of the clutch between the engaged and disengaged positions and to control operation of the pilot-operated blocking valve.

Preferably, the feed roll motor is a continuously operated variable displacement motor.

Preferably, the drive system further comprises a foreign object sensor and quick stop valve.

Preferably, the drive system further comprises a set of lower roller gears operable by a supply of fluid from the second hydraulic variable displacement pump to the feed roll motor to drive a first lower set of feed rolls by a gear chain.

Preferably, the drive system further comprises a set of upper roller gears operable by a supply of fluid from the second hydraulic variable displacement pump to the feed roll motor to drive a second upper set of feed rolls by a gear chain and a cardan shaft.

Preferably, the drive system further comprises a chopper drum brake valve comprising a main piston part and a directional control valve.

Within the scope of this application, it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The invention will now be described, by way of example only, with reference to the accompanying drawings, in which.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
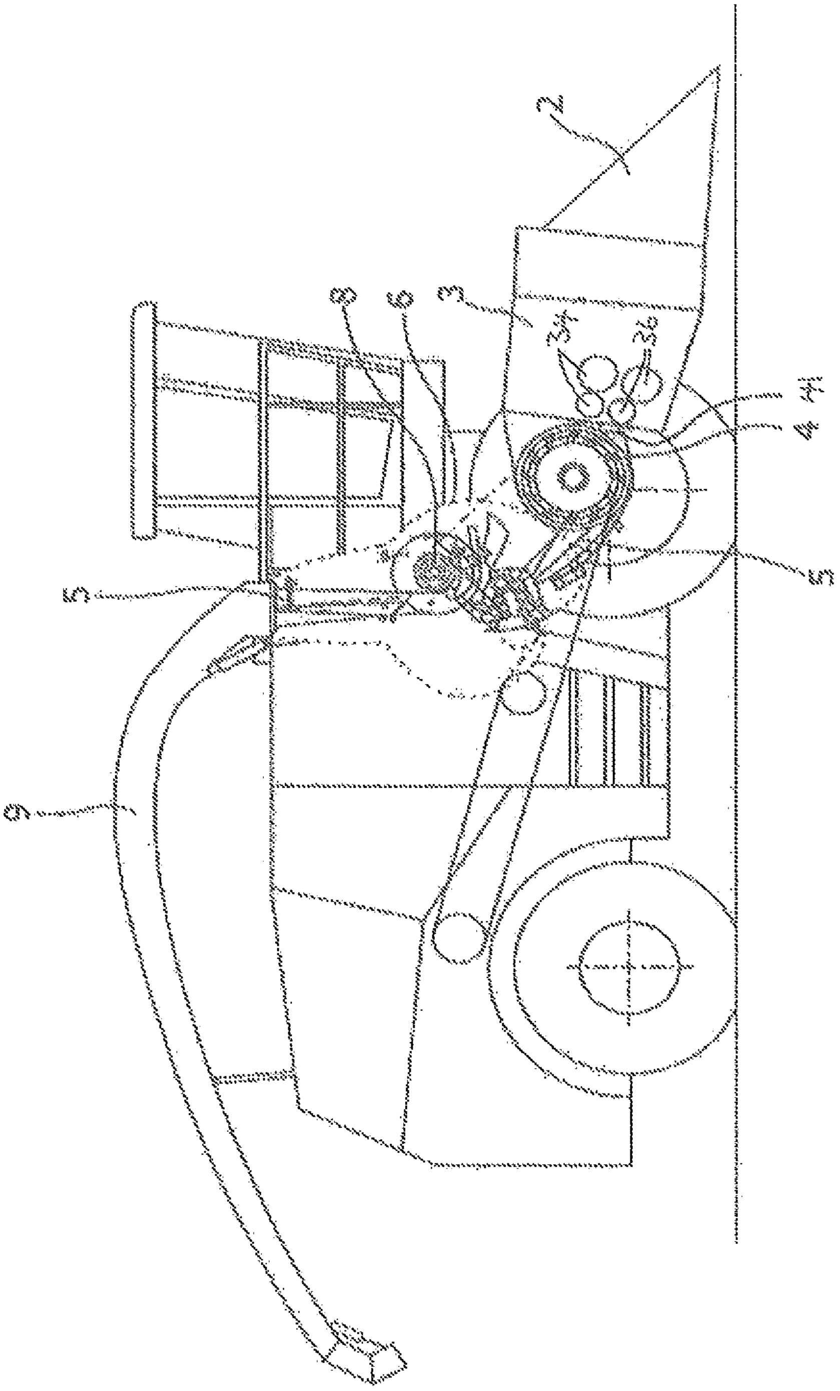
FIG. 1 shows a schematic side view of a forage harvester.

FIG. 1 shows a forage harvester provided with a front attachment 2 such as a header which contains cutting equipment for cutting and harvesting a crop. The cut crop is fed from the header via associated feed rollers 34,36 in a housing 3 to a chopper drum 4 where the crop is chopped into smaller pieces between the chopper drum 4 and an associated shear bar 41. The chopped crop passes through a duct 5 and is optionally directed into a cracker unit 6 where the crop is further crushed and threshed. The harvested crop is then blown upwards along the duct 5 by an accelerator 8 and exits through a spout 9 directing the processed crop into a trailer or other vehicle moving alongside the forage harvester.

Figure 2:
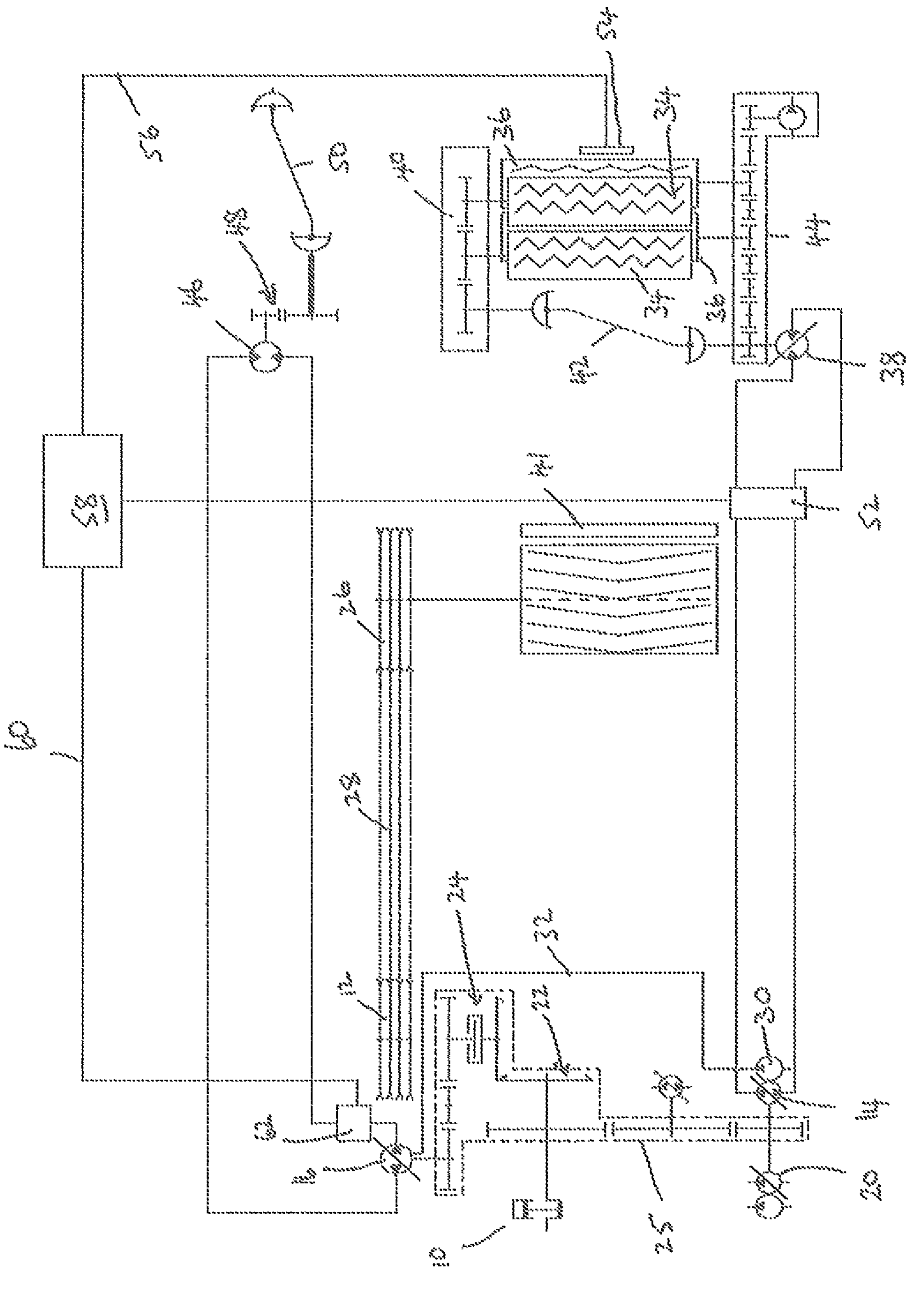
FIG. 2 shows diagrammatically the electronic and hydraulic elements of a braking system for a forage harvester in accordance with the present invention.

FIG. 2 shows in diagrammatic form the electronic and hydraulic elements of a drive system for elements of a forage harvester in accordance with the present invention.

A prime mover 10 such as an internal combustion engine of the forage harvester is provided to drive various mechanical outputs, such as a first pulley 12, and hydraulic pumps 14, 16, 20, 30 by way of a transmission including an output gear 22 and a disengageable clutch 24 provided within a housing 25. Some of the outputs of the clutch 24 can be switched on or off during operation of the prime mover. In the illustrated embodiment, a first hydraulic pump 16 and first pulley 12 are switched via the clutch 24, while other of the hydraulic pumps 14, 20, 30 are driven continuously.

The chopper drum 4 is driven by a second pulley 26 fixed rotationally to the chopper drum 4. A drive belt 28 between the first pulley 12 and the second pulley 26 enables the chopper drum 4 to be driven by the prime mover while the clutch 24 is engaged.

As will be understood, the chopper drum 4 has a large mass which together with the speed of rotation leads to a long run out of the chopper drum when the clutch 24 is disengaged, that is, in the absence of braking of the chopper drum it takes an undesirably long time for the chopper drum to come to rest. Typical run down times for an unbraked chopper drum are around 50 seconds. During this time, the rotating chopper drum presents a potential danger, for example, to an operator seeking to clear a blockage.

A second hydraulic pump 14 is a swash plate variable displacement pump for closed circuits. Pump 14 is in communication with internal charge pump 30.

First hydraulic pump 16 is a swash plate variable displacement pump for closed circuits without an additional charge pump. Charge pump 30 supplies both the first hydraulic pump 16 and the second variable displacement pump 14 with charge pressure. First hydraulic pump 16 is fed by a line 32 extending from charge pump 30 to the first hydraulic pump 16. In comparison to the disclosed circuit of WO 2011/128286, the use of a single charge pump makes the use of a separate charge pump for the first hydraulic pump 16 superfluous, as is the need for the associated additional valve arrangements of such a construction.

Lower and upper sets of feed rollers 34,36 are also driven by the hydraulic system. Variable displacement pump 14 conveys an oil flow, the quantity of which can be adjusted, to a bent axis displacement motor 38 which drives a lower roller gear set 44. A set of two lower feed rollers 36 are driven via a gear chain in the lower roller gear set 44.

A cardan shaft 42 drives an upper roller gear set 40 which drives a set of two upper feed rollers 34 via a gear chain.

The speed of the hydraulic motor 38 and the resulting speed of the upper and lower feed rollers 34,36 can be adjusted over a wide range by the combination of the second variable displacement pump 14 and the variable displacement motor 38. Such a good range of adjustability advantageously results in a large range of cutting length without the need for additional cutting length gear. Since the second variable displacement pump 14 is driven continuously, this enables the reversal of the direction of rotation of the feed rollers 34,36, even where the chopper drum 4 is clogged and so blocked from rotation.

The first variable displacement pump 16 promotes an oil flow, the amount of which can be adjusted, to a bent axis constant motor 46 which is also used to drive a header gear 48 in turn driving the header via a cardan shaft 50. Since a relatively small speed spread of 1:3 is needed for the harvesting attachment 2, the hydraulic motor 46 can be designed as a constant motor.

Both circuits (between pump 16 and motor 46 and between pump 14 and variable displacement motor 38) can change the direction of rotation of the associated oil motors 38,46 by reversing the direction of the oil flow in the pumps 14,16 thus enabling the feed rollers 34,36 and the header to be reversed, for example to allow removal of blockages.

A quick stop valve 52 is provided in the feed roller circuit. If a ferromagnetic body is drawn into the feed rollers, this is detected by a sensor 54. A reporting signal is sent to an electronic control unit 58, for example via a signal line 56. While a signal line 56 is illustrated it will be understood that this signal line (and the others referred to in this description) may take any suitable form and include a wireless communication route. On receipt of such a reporting signal the electronic control unit 58 issues a signal to actuate the quick stop valve 52, for example via a signal line 59. As a result of actuation of the quick stop valve 52 the feed motor 38 is stopped immediately and the associated stopping of the feed rollers 34,36 prevents the foreign body from reaching the chopper drum 4 and causing damage there. Such quick stop valves are known in the art (for example as disclosed in EP2557911) and will not be described further.

Figure 3:
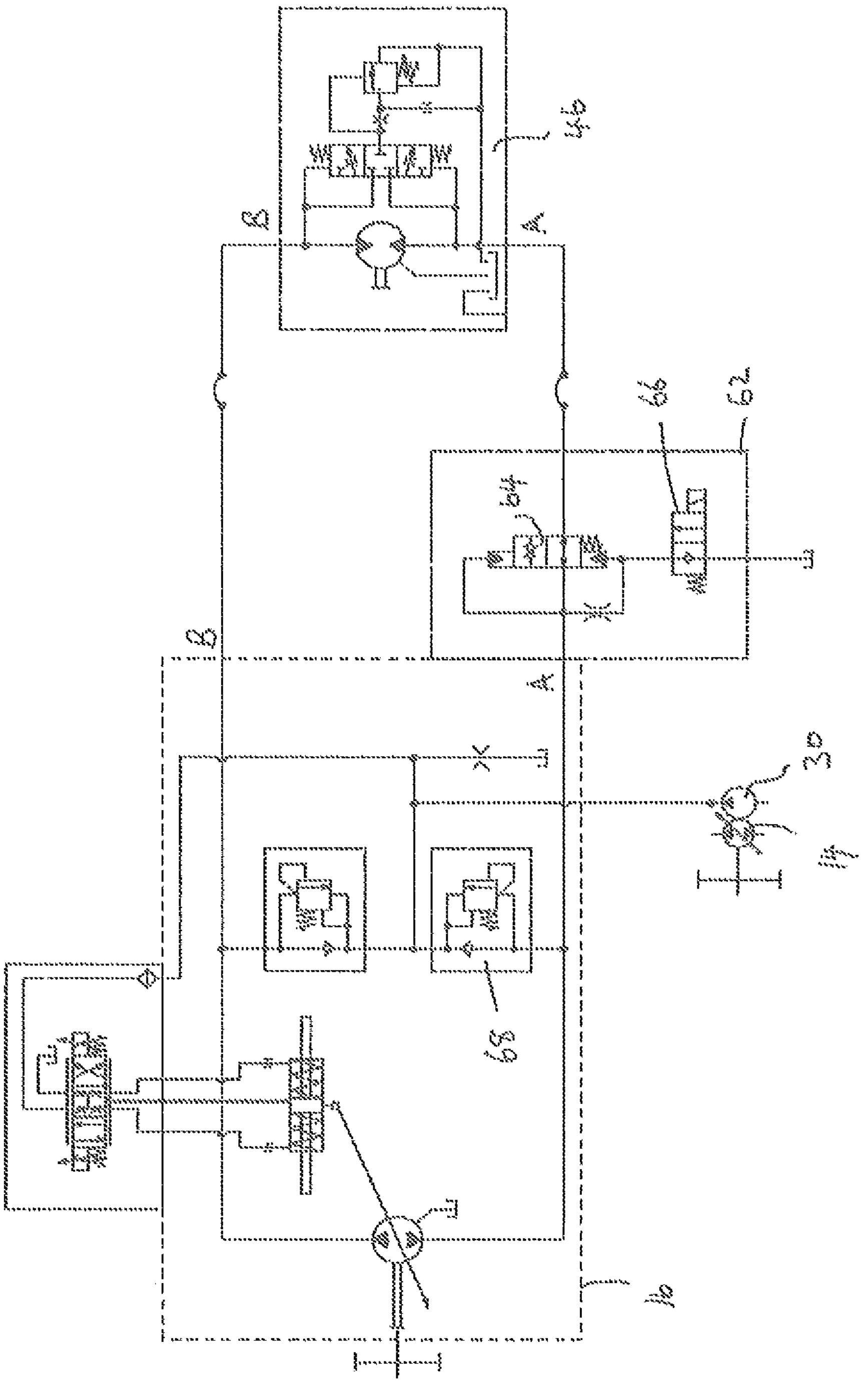
FIG. 3 shows diagrammatically a hydraulic supply circuit for use in the present invention.

A chopper drum brake valve 62 is arranged in the header circuit. Further details of the chopper drum brake valve 62 may be seen in FIG. 3. In normal working operation, the oil flow of the first variable displacement pump 16 flows from port A (FIG. 3) via brake valve 62 to port A of the hydraulic motor 46 and so drives the hydraulic motor 46. The oil then flows along a return line from port B of the motor 46 to port B of the first variable displacement pump 16.

Chopper drum brake valve 62 comprises a pilot-operated blocking valve 64 and a directional control valve 66. The pilot-operated blocking valve 64 is in an open position in both forward and reverse operation of the motor 46. The directional control valve 66 is a seat tight directional control valve, which is closed when in the deenergized spring condition and open when energised. It can be seen that this construction of the chopper drum brake valve 62 omits the relief valve required in the construction of the chopper brake control circuit disclosed in WO 2011/128286, resulting in a simpler, less expensive design. Further, since the chopper drum brake valve 62 is only connected to the one port of the motor 46, this arrangement is simpler and more cost effective to install in the forage harvester than the arrangement disclosed in WO 2011/128286.

If an operator wishes to interrupt operation of the chopper drum 4, an instructing signal is provided to the electronic control unit 58 causing the electronic control unit 58 to send a suitable signal to cause the clutch 24 to be disengaged. Conveniently the forage harvester is provided with a user input terminal within a cab of the forage harvester for the operator to use to cause such an instructing signal to be provided to the electronic control unit 58.

On receipt of such an instructing signal, the electronic control unit 58 sends a suitable signal, for example via a signal line, to the directional control valve 66 to energise the directional control valve 66. When the directional control valve 66 is energised, the balance of forces on the ends of the piston causes the main piston part 64 to move from the open position to a closed position.

Once energised, the oil flow of the variable displacement pump 16 can no longer escape from port A and instead flows out through an internal high pressure relief valve 68 of the first variable displacement pump 16. The volumetric flow that flows via the high pressure relief valve 68 can be adjusted by adjusting the swivel angle of the first variable displacement pump 16. In this operating situation, a high drive torque occurs on the pump shaft, which is transmitted from the pump shaft via the gear chain to the first pulley 12, the drive belt 28 and so to the chopper drum 4. In this way, the drive torque of the first variable displacement pump 16 acts as a brake for the chopper drum 4 and reduces the run out time of the chopper drum to around 6 or 7 seconds.

The swash angle of the first variable displacement pump 16 can be set to a given design of chopper drum. For example, as will be understood, chopper drums 4 include a number of chopping blades designed to interact with a shear bar to chop the harvested crop fed through the harvester. It is known to produce chopper drums having 20, 28 or 38 chopper blades about the circumference of the chopper drum. The weight and inertia of these different designs of chopper drum will differ from one another. The swash angle of first variable displacement pump 16 may be adjusted to ensure that the runout time of the chopper drum, whatever the design, is kept to around 6 or 7 seconds.

From reading the present disclosure, other modifications will be apparent to persons skilled in the art. Such modifications may involve other features which are already known in the field of forage harvesters and component parts therefore and which may be used instead of or in addition to features already described herein.

From reading the present disclosure, other modifications will be apparent to persons skilled in the art. Such modifications may involve other features which are already known in the field of forage harvesters and component parts therefore and which may be used instead of or in addition to features already described herein.

What is claimed is:

1. A drive system for a forage harvester, the forage harvester comprising a prime mover, a chopper drum driven from the prime mover via a drive train, and feed rolls, the drive system comprising a clutch operable between an engaged condition connecting the chopper drum to the prime mover and a disengaged position in which the chopper drum is disconnected from the prime mover, a first hydraulic variable displacement pump connected with the chopper drum which pumps fluid around a first hydraulic circuit connected to a first motor, a second hydraulic variable displacement pump which pumps fluid around a second hydraulic circuit to a feed roll motor connected with the feed rolls of the forage harvester, the drive system further comprising a single charge pump hydraulically connected to both the first hydraulic variable displacement pump and the second hydraulic variable displacement pump, wherein when the clutch is operated to adopt the disengaged position and isolate the chopper drum from the prime mover, the drive system is operated to brake the chopper drum by operating a pilot-operated blocking valve in the first hydraulic circuit to disconnect fluid flow between the first pump and the first motor and divert flow through a high pressure relief valve located internally of the first hydraulic variable displacement pump.

2. The drive system for a forage harvester according to claim 1, further comprising an electronic controller operable to control operation of the clutch between the engaged and disengaged positions and to control operation of the pilot-operated blocking valve.

3. The drive system for a forage harvester according to claim 1, characterised in that the feed roll motor is a continuously operated variable displacement motor.

4. The drive system for a forage harvester according to claim 1, further comprising a foreign object sensor and quick stop valve.

5. The drive system for a forage harvester according to claim 1, further comprising a chopper drum brake valve comprising a main piston part and a directional control valve.

6. A drive system for a forage harvester, the forage harvester comprising a prime mover, a chopper drum driven from the prime mover via a drive train, and feed rolls, the drive system comprising a clutch operable between an engaged condition connecting the chopper drum to the prime mover and a disengaged position in which the chopper drum is disconnected from the prime mover, a first hydraulic variable displacement pump connected with the chopper drum which pumps fluid around a first hydraulic circuit connected to a first motor, a second hydraulic variable displacement pump which pumps fluid around a second hydraulic circuit to a feed roll motor connected with the feed rolls of the forage harvester, the drive system further comprising a single charge pump hydraulically connected to both the first hydraulic variable displacement pump and the second hydraulic variable displacement pump, and further comprising a set of lower roller gears operable by a supply of fluid from the second hydraulic variable displacement pump to the feed roll motor to drive a first lower set of feed rolls by a gear chain.

7. The drive system for a forage harvester according to claim 6, further comprising a set of upper roller gears operable by a supply of fluid from the second hydraulic variable displacement pump to the feed roll motor to drive a second upper set of feed rolls by a gear chain and a cardan shaft.

8. The drive system for a forage harvester according to claim 6, wherein when the clutch is operated to adopt the disengaged position and isolate the chopper drum from the prime mover, the drive system is operated to brake the chopper drum by operating a pilot-operated blocking valve in the first hydraulic circuit to disconnect fluid flow between the first pump and the first motor and divert flow through a high pressure relief valve located internally of the first hydraulic variable displacement pump.

9. The drive system for a forage harvester according to claim 8, further comprising a foreign object sensor and quick stop valve.

10. The drive system for a forage harvester according to claim 8, further comprising a chopper drum brake valve comprising a main piston part and a directional control valve.

* * * * *